US007282084B2

(12) United States Patent
Tempel et al.

(10) Patent No.: US 7,282,084 B2
(45) **Date of Patent: *Oct. 16, 2007**

(54) LIQUID MEDIA CONTAINING LEWIS BASIC REACTIVE COMPOUNDS FOR STORAGE AND DELIVERY OF LEWIS ACIDIC GASES

(75) Inventors: Daniel Joseph Tempel, Macungie, PA (US); Philip Bruce Henderson, Allentown, PA (US); Jeffrey Richard Brzozowski, Kunkletown, PA (US); Ronald Martin Pearlstein, Macungie, PA (US)

(73) Assignee: Air Products and Chemicals, Inc., Allentown, PA (US)

( * ) Notice: Subject to any disclaimer, the term of this patent is extended or adjusted under 35 U.S.C. 154(b) by 295 days.

This patent is subject to a terminal disclaimer.

(21) Appl. No.: 10/966,803

(22) Filed: Oct. 15, 2004

(65) Prior Publication Data

US 2006/0081482 A1 Apr. 20, 2006

(51) Int. Cl.
*F17C 11/00* (2006.01)
*B01D 19/00* (2006.01)

(52) U.S. Cl. .......... 95/241

(58) Field of Classification Search .......... 95/149, 95/232, 233, 234, 235, 241; 96/108, 155, 96/243; 423/210; 422/129; 206/0.6, 0.7; 222/3; 252/181.3, 183.11
See application file for complete search history.

(56) References Cited

U.S. PATENT DOCUMENTS

| | | | | |
|---|---|---|---|---|
| 4,744,221 | A | 5/1988 | Knollmueller | |
| 5,473,904 | A * | 12/1995 | Guo et al. | 62/46.1 |
| 5,518,528 | A | 5/1996 | Tom et al. | |
| 5,704,965 | A | 1/1998 | Tom et al. | |
| 5,993,766 | A | 11/1999 | Tom et al. | |
| 6,500,238 | B1 | 12/2002 | Brandes et al. | |

FOREIGN PATENT DOCUMENTS

| | | |
|---|---|---|
| EP | 0740104 A2 * | 10/1996 |
| EP | 1 486 458 | 12/2004 |
| WO | WO 97/36819 | 10/1997 |

* cited by examiner

*Primary Examiner*—Frank M. Lawrence
(74) *Attorney, Agent, or Firm*—Lina Yang; Geoffrey L. Chase

(57) ABSTRACT

This invention relates to an improvement in a low-pressure storage and delivery system for gases having Lewis acidity, particularly hazardous specialty gases such as $BF_3$ and diborane, which are utilized in the electronics industry. The improvement resides in storing the gases in a liquid incorporating a reactive compound having Lewis basicity capable of effecting a reversible reaction between a gas having Lewis acidity. The reactive compound comprises a reactive species that is dissolved, suspended, dispersed, or otherwise mixed with a nonvolatile liquid.

17 Claims, No Drawings

LIQUID MEDIA CONTAINING LEWIS BASIC REACTIVE COMPOUNDS FOR STORAGE AND DELIVERY OF LEWIS ACIDIC GASES

BACKGROUND OF THE INVENTION

Many processes in the semiconductor industry require a reliable source of process gases for a wide variety of applications. Often these gases are stored in cylinders or vessels and then delivered to the process under controlled conditions from the cylinder. The semiconductor manufacturing industry, for example, uses a number of hazardous specialty gases such as phosphine, arsine, and boron trifluoride for doping, etching, and thin-film deposition. These gases pose significant safety and environmental challenges due to their high toxicity and pyrophoricity (spontaneous flammability in air). In addition to the toxicity factor, many of these gases are compressed and liquefied for storage in cylinders under high pressure. Storage of toxic gases under high pressure in metal cylinders is often unacceptable because of the possibility of developing a leak or catastrophic rupture of the cylinder.

In order to mitigate some of these safety issues associated with high pressure cylinders, on-site electrochemical generation of such gases has been used. Because of difficulties in the on-site synthesis of the gases, a more recent technique of low pressure storage and delivery systems has been to adsorb these gases onto a solid support. These storage and delivery systems are not without their problems. They suffer from poor capacity and delivery limitations, poor thermal conductivity, and so forth.

The following patents and articles are illustrative of low pressure, low flow rate gas storage, and delivery systems.

U.S. Pat. No. 4,744,221 discloses the adsorption of $AsH_3$ onto a zeolite. When desired, at least a portion of the $AsH_3$ is released from the delivery system by heating the zeolite to a temperature of not greater than about 175° C. Because a substantial amount of $AsH_3$ in the container is bound to the zeolite, the effects of an unintended release due to rupture or failure are minimized relative to pressurized containers.

U.S. Pat. No. 5,518,528 discloses storage and delivery systems based on physical sorbents for storing and delivering hydride, halide, and organometallic Group V gaseous compounds at sub-atmospheric pressures. Gas is desorbed by dispensing it to a process or apparatus operating at lower pressure.

U.S. Pat. No. 5,704,965 discloses sorbents for use in storage and delivery systems where the sorbents may be treated, reacted, or functionalized with chemical moieties to facilitate or enhance adsorption or desorption of fluids. Examples include the storage of hydride gases such as arsine on a carbon sorbent.

U.S. Pat. No. 5,993,766 discloses physical sorbents, e.g., zeolites and carbon, for sub-atmospheric storage and dispensing of fluids in which the sorbent can be chemically modified to affect its interaction with selected fluids. For example, a sorbent material may be functionalized with a Lewis basic amine group to enhance its sorbtive affinity for $B_2H_6$ (sorbed as $BH_3$).

BRIEF SUMMARY OF THE INVENTION

This invention relates generally to an improvement in low pressure storage and dispensing systems for the selective storing of gases having Lewis acidity and the subsequent dispensing of said gases, generally at pressures of 5 psig and below, typically at subatmospheric pressures, e.g., generally below 760 Torr, by pressure differential, heating, or a combination of both. The improvement resides in storing gases having Lewis acidity in a reversibly reacted state in a liquid containing a reactive compound having Lewis basicity.

Several advantages for achieving safe storage, transportation, and delivery of gases having Lewis acidity. These include:

an ability to maintain a reliable source of these gases in a liquid medium wherein the gases are maintained near or below atmospheric pressure during shipping and storage;

an ability to store and deliver gases in essentially pure form;

an ability to manage the problems associated with the transfer of heat during gas loading and dispensing;

an ability to allow for mechanical agitation and pumping, thereby making operations such as compound transfer more efficient;

an ability to optimize the binding affinity for a given gas through choice of reactive component; and, an ability to obtain high gas (or working) capacities compared to the surface adsorption and chemisorption approaches associated with solid adsorbents.

DETAILED DESCRIPTION OF THE INVENTION

Non-volatile liquids are used to prepare solutions or mixtures in combination with Lewis basic reactive compounds that are capable of chemically reacting with Lewis acidic gases. In this way, hazardous Lewis acidic gases such as $BF_3$, $B_2H_6$ or $BH_3$ and $SiF_4$ can be safely stored and transported, preferably at or below atmospheric pressure. Chemical coordination is sufficiently reversible to allow at least a portion of that gas to be delivered at a useful rate at low pressures.

This invention relates to an improvement in a low-pressure storage and delivery system for gases, particularly hazardous specialty gases such as boron trifluoride, diborane, borane, and silicon tetrafluoride, which are utilized in the electronics industry. The improvement resides in storing of gases having Lewis acidity in a liquid incorporating a reactive compound having Lewis basicity capable of effecting a reversible reaction with the gas having Lewis acidity. The reactive compound comprises a reactive species that is dissolved, suspended, dispersed, or otherwise mixed with a nonvolatile liquid.

The system for storage and dispensing of a gas comprises a storage and dispensing vessel constructed and arranged to hold a liquid incorporating a reactive compound having an affinity for the gas to be stored, and for selectively flowing such gas into and out of such vessel. A dispensing assembly is coupled in gas flow communication with the storage and dispensing vessel, and it is constructed and arranged for selective, on-demand dispensing of the gas having Lewis acidity, by thermal and/or pressure differential-mediated evolution from the liquid mixture. The dispensing assembly is constructed and arranged:

(i) to provide, exteriorly of said storage and dispensing vessel, a pressure below said interior pressure, to effect evolution of the gas from the reactive compound contained in the liquid, and flow of gas from the vessel through the dispensing assembly; and/or (ii) to provide means for removal of heat of reaction of the gas with the liquid medium containing the reactive compound and for heating the liquid mixture to effect evolution of the gas therefrom, so that the gas flows from the vessel through the dispensing assembly.

Thus, the invention relates to a system for the storage and delivery of a gas having Lewis acidity, comprising a storage and dispensing vessel containing a liquid incorporating a reactive compound having Lewis basicity and having a readily reversible reactive affinity for the gas having Lewis acidity.

A feature of the invention is that the gas is readily removable from the reactive compound contained in the liquid medium by pressure-mediated and/or thermally-mediated methods. By pressure-mediated removal it is meant that removal which can be effected by a change in pressure conditions, which typically range from $10^{-1}$ to $10^{-7}$ Torr at 25° C., to cause the gas to be released from the reactive compound and evolve from the liquid carrying the reactive compound. For example, such pressure conditions may involve the establishment of a pressure differential between the liquid incorporating the reactive compound in the vessel, and the exterior environment of the vessel, which causes flow of the fluid from the vessel to the exterior environment (e.g. through a manifold, piping, conduit or other flow region or passage). The pressure conditions effecting removal may involve the imposition on the contents within the vessel under vacuum or suction conditions which effect extraction of the gas from the reactive mixture and thus from the vessel.

By thermally-mediated removal it is meant that removal of the gas can be achieved by heating the contents in the vessel sufficiently to cause the evolution of the gas bonded with the reactive compound so that the gas can be withdrawn or discharged from the liquid medium and thus from the vessel. Typically, the temperature for thermal mediated removal or evolution ranges from 30° C. to 150° C. Because the reactant is a compound carried in a liquid medium, as opposed to a porous solid medium employed in the prior art processes, thermally-mediated evolution can be utilized, if desired. For reasons of efficiency, pressure mediated removal is preferred.

A suitable liquid carrier for the reactive compound has low volatility and preferably has a vapor pressure below about $10^{-2}$ Torr at 25° C. and, more preferably, below $10^{-4}$ Torr at 25° C. In this way, the gas to be evolved from the liquid medium can be delivered in substantially pure form and without substantial contamination from the liquid solvent or carrier. Liquids with a vapor pressure higher than $10^{-2}$ Torr may be used if contamination can be tolerated. If not, a scrubbing apparatus may be required to be installed between the liquid mixture of liquid carrier and reactive compound and process equipment. In this way, the liquid can be scavenged to prevent it from contaminating the gas being delivered. Ionic liquids have low melting points (i.e. typically below room temperature) and high boiling points (i.e. typically above 250° C. at atmospheric pressure) which make them well suited as solvents or carriers for the reactive compounds.

Ionic liquids suited for use can be neutral or they can act as a reactive liquid, i.e., as a Lewis base, for effecting reversible reaction with the gas to be stored. These reactive ionic liquids have a cation component and an anion component. The acidity or basicity of the reactive ionic liquids then is governed by the strength of the cation, the anion, or by the combination of the cation and anion. The most common ionic liquids comprise salts of tetraalkylphosphonium, tetraalkylammonium, N-alkylpyridinium or N,N'-dialkylimidazolium cations. Common cations contain $C_{1-18}$ alkyl groups, and include the ethyl, butyl and hexyl derivatives of N-alkyl-N'-methylimidazolium and N-alkylpyridinium. Other cations include pyrrolidinium, pyridazinium, pyrimidinium, pyrazinium, pyrazolium, triazolium, thiazolium, and oxazolium.

Also known are "task-specific" ionic liquids (TSILs) bearing reactive functional groups on the cation or the anion, and these ionic liquids can be used here. Task specific ionic liquids often are aminoalkyl, such as aminopropyl; ureidopropyl, and thioureido derivatives of the above cations. Specific examples of task-specific ionic liquids containing functionalized cations include salts of 1-alkyl-3-(3-aminopropyl)imidazolium, 1-alkyl-3-(3-cyanopropyl)imidazolium, 1-alkyl-3-(3-ureidopropyl)imidazolium, 1-alkyl-3-(3-thioureidopropyl)imidazolium, 1-alkyl-4-(2-diphenylphosphanylethyl)pyridinium, 1-alkyl-3-(3-sulfopropyl)imidazolium, and trialkyl-(3-sulfopropyl) phosphonium. Examples of TSILs containing functionalized anions include salts of 2-(2-methoxyethoxy)ethyl sulfate, dicyanamide, and tetracyanoborate.

A wide variety of anions can be matched with the cation component of such ionic liquids for achieving a neutral ionic liquid or one that possesses Lewis basicity. Commonly used anions include carboxylates, fluorinated carboxylates, sulfonates, fluorinated sulfonates, imides, borates, phosphates, antimonates, halides, halometallates, etc. Preferred anions include $Cl^-$, $Br^-$, $BF_4^-$, $PF_6^-$, $AlCl_4^-$, $NO_2^-$, $ClO_4^-$, p-$CH_3$—$C_6H_4SO_3^-$, $CF_3SO_3^-$, $FSO_3^-$, $Cl_3CSO_3^-$, $CH_3OSO_3^-$, $CH_3CH_2OSO_3^-$, $(CF_3SO_2)_2N^-$, $(NC)_2N^-$, $(CF_3SO_2)_3C^-$, $CH_3COO^-$ and $CF_3COO^-$.

Other suitable liquid carriers include oligomers and low molecular weight polymers, hyperbranched and dendritic amorphous polymers, natural and synthetic oils, etc. Specific examples of suitable liquid carriers include alkylene carbonates, glymes, polyether oils, perfluoropolyether oils, chlorotrifluoroethylene oils, hydrofluorocarbon oils, polyphenyl ether, silicone oils, fluorosilicone oils, hydrocarbon (refined petroleum) oils, hyperbranched polyethylene, hyperbranched polyether, polyester polyols, polyether polyols, polycarbonates, etc. Some of these liquids suffer from excessive volatility at elevated temperatures, in which case they are not suited for thermal-mediated evolution. However, they may be suited for pressure-mediated evolution.

A suitable reactive compound for reversibly reacting with the gas to be stored and subsequently delivered therefrom should also have low volatility and preferably has a vapor pressure below about $10^{-2}$ Torr at 25° C. and, more preferably, below $10^{-4}$ Torr at 25° C. In this way, the gas to be evolved from the reactive compound and the liquid medium can be delivered in substantially pure form and without substantial contamination from the reactive species. Reactive compounds having a vapor pressure higher than $10^{-2}$ Torr may be used if contamination can be tolerated. If not, a scrubbing apparatus may be required to be installed between the storage vessel and process equipment. In this way, the reactive compound can be scavenged to prevent it from contaminating the gas being delivered.

Lewis basic reactive compounds include polymers, oligomers, and organic compounds containing, e.g., ether, amine, alcohol, ester, sulfide, thioether, sulfoxide, ketone, aldehyde, nitrile, imine, phosphine, phosphite, olefin, diolefin and aromatic groups. Nonvolatile liquid and polymeric compounds incorporating Lewis basic functionality are preferred. Reactive compounds also include anions, e.g. carboxylate, sulfonate, sulfate, and phosphate groups. Reactive compounds containing such functional groups are commonly encountered as ligands for binding a wide range of metal centers.

Examples of reactive compounds based on Lewis base functionalized monomers include, polyethylene glycol, polypropylene glycol, polytetramethylene ether glycol, polyvinyl amine, polyaryl sulfone, polyphenylene sulfide, polyacrylic acid, polyvinyl alcohol, polymethyl vinyl ether, polymethyl vinyl ketone, polyaniline, polypyrrole, polythiophene, polyvinyl pyridine, and oligomers and copolymers of ethylene oxide, propylene oxide, acrylic acid, alkyl acrylates, alkyl methacrylates, acrylamide, acrylonitrile, methyl vinyl ketone, methyl vinyl ether, 4-vinylbenzonitrile, etc.

Suitable Lewis basic anionic compounds include alkoxides, aryloxides, carboxylates, halides, sulfonates, sulfates, borates, phosphates, arsenates, etc., e.g. salts of $RO^-$, $CH_3CO_2^-$, $HCO_2^-$, $Cl^-$, $Br^-$, $R_2N^-$, $CN^-$, $SCN^-$, $NO_2^-$, $NO_3^-$, $FSO_3^-$, $CF_3SO_3^-$($^-$OTf), $RSO_3^-$, $ROSO_3^-$, $ClO_4^-$, $BF_4^-$, $BR_4^-$, $PF_6^-$, $PR_3F_3^-$, $AsF_6^-$, $SO_4^{2-}$, where R is alkyl, cycloalkyl, aryl, alkoxy, aryloxy, haloalkyl, haloalkoxy, a polymer etc. R may incorporate additional neutral donor or ionic groups. The counterion of such salts may comprise inorganic or organic cations such as $Na^+$, $K^+$, $Li^+$, $Mg^{2+}$, $Ca^{2+}$, $Ba^{2+}$, $NH_4^+$, $NR_4^+$, $R_3PH^+$, $PR_4^+$, N-alkylpyridinium, N,N'-dialkylimidazolium, pyridazinium, pyrimidinium, pyrazinium, pyrazolium, pyrrolidinium, triazolium, thiazolium, oxazolium, etc, where R is typically alkyl. R may incorporate additional neutral donor or ionic groups. Specific examples include $Ca(O_2CH)_2$, $Mg(O_2CCH_3)_2$, $BaSO_4$, $Na_2SO_4$, $KOCH_2CH_3$, $LiN(SO_2CF_3)_2$, $KSO_3CF_3$, $AgSO_3CF_3$, $NaClO_4$, $[(CH_3CH_2CH_2CH_2)_4N][BF_4]$, $[(CH_3CH_2CH_2CH_2)_4N][SO_3CF_3]$, $[(CH_3CH_2CH_2CH_2)_4N][OCH_2CH_3]$, $[(CH_3)_4N][SO_3CH_3]$, $[(CH_3)_4N][CN]$, $[(CH_3)_4N][CH_3SO_3]$, $[(CH_3)_4N][ClO_4]$, $[(CH_3)_4N][SCN]$, $[(CH_3CH_2)_4N][OH]$, $[(CH_3CH_2)_4N][Cl]$, $[(CH_3CH_2)_4N][Br]$, etc.

Some compounds may suffer from excessive volatility at elevated temperatures and are not suited for thermal-mediated evolution. However, they may be suited for pressure-mediated evolution.

Gases having Lewis acidity to be stored and delivered from a liquid incorporating a reactive compound having Lewis basicity may comprise one or more hydride or halide gases, e.g., boron trifluoride, diborane, borane, silicon tetrafluoride, germanium tetrafluoride, germane, phosphorous trifluoride, phosphorous pentafluoride, arsenic pentafluoride, sulfur tetrafluoride, tin tetrafluoride, tungsten hexafluoride, molybdenum hexafluoride, acidic organic or organometallic compounds, etc.

The reactive compound should be dispersed throughout the liquid medium to achieve optimum capacities for gas storage. Some of the reactive compounds may be solid and at least partially insoluble in the liquid medium. To facilitate the incorporation of the reactive compound in the liquid medium, if not soluble, it may be emulsified, stabilized with surfactants, or cosolvents may be added.

The reactive compound should be incorporated in the liquid medium in an amount sufficient to meet preselected capacity and delivery requirements of the system. In the context of the liquid carrier, a molar ratio of at least about 0.3 moles reactive compound per 1000 mL of liquid is generally acceptable.

To provide an understanding of the concepts disclosed herein the following are relevant definitions to the process:

Definitions:

Total Capacity (or Capacity): Moles of gas that will react with one liter of a reactive liquid medium at a given temperature and pressure.

Working Capacity ($C_W$): Moles of gas per liter of a reactive liquid medium which is initially stored and is subsequently removable from the mixture during the dispensing operation, specified for a given temperature and pressure range, typically at 20 to 50° C. over the pressure range 20 to 760 Torr.

$C_w$=(moles of reacted gas−moles of gas remaining after delivery)/(liters of reactive liquid medium)

Percent Reversibility: Percentage of gas initially reacted with the reactive compound which is subsequently removable by pressure differential, specified for a given temperature and pressure range, typically at 20 to 50° C. over the pressure range 20 to 760 Torr.

% Reversibility=[(moles of reacted gas−moles of gas remaining after delivery)/(moles of initially reacted gas)]*100

It has been found that good Lewis acid/base systems can be established from the Gibbs free energy of reaction ($\Delta G_{rxn}$) for a given system. In a storage and delivery system based upon a reactive mixture and a gas having Lewis acidity, an operable $\Delta G_{rxn}$ range exists for operable temperature and pressure and is from about 1.3 to about −4.5 kcal/mole. There also exists an optimum $\Delta G_{rxn}$ for a given temperature and pressure range, which corresponds to a maximum working capacity for the mixture. In reference to the gas $BF_3$, if the magnitude of $\Delta G_{rxn}$ (and thus, $K_{eq}$) is too small, the reactive mixture will have insufficient capacity for $BF_3$. This insufficient capacity may be compensated for by selecting a reactive mixture with a higher total capacity (i.e. higher concentration of $BF_3$ reactive groups). If the magnitude of $\Delta G_{rxn}$ (and thus, $K_{eq}$) is too large, an insufficient amount of $BF_3$ will be removable at the desired delivery temperature. For the reaction of $BF_3$ with a Lewis basic group, B, at 25° C. and in the pressure range 20 to 760 Torr, the optimum value range for $\Delta G_{rxn}$ is about from −0.5 to −1.6 kcal/mol. For all systems in solution involving the reaction of a single equivalent of Lewis acid gas with a single equivalent of Lewis base group, the optimum $\Delta G_{rxn}$ will be about −1.1 kcal/mol at 25° C. and between 20 to 760 Torr. The situation is more complex for other systems, e.g., if the Lewis acid gas and Lewis base group react to give a solid complex, or if more than one equivalent of a gas reacts with a single equivalent of a Lewis base group.

One of the difficulties in the development of a suitable storage and delivery system is the matching of a suitable reactive mixture with a suitable gas through prediction of the $\Delta G_{rxn}$. To minimize experimentation and project the viability of possible systems, quantum mechanical methods can be used to elucidate molecular structures. Density Functional Theory (DFT) is a popular ab initio method that can be used to determine a theoretical value for the change in electronic energy for a given reaction ($\Delta E_{rxn}$=sum of $E_{products}$−sum of $E_{reactants}$). The following is a discussion for this determination. The calculations are assumed to have an error of approximately ±3 kcal/mol.

The reaction of one equivalent of $BF_3$ gas with one equivalent of a Lewis base (B) in the liquid phase to give a reaction product in the liquid phase is represented by the equations:

$$BF_3\ (\text{gas}) \overset{K_1}{\rightleftharpoons} BF_3\ (\text{soln})$$

$$B + BF_3\ (\text{soln}) \overset{K_2}{\rightleftharpoons} B\text{—}BF_3$$

$$B + BF_3\ (\text{gas}) \overset{K_{eq}}{\rightleftharpoons} B\text{—}BF_3$$

$$K_{eq} = K_1 K_2 = \frac{[B\text{—}BF_3]}{[B][BF_3\ (\text{gas})]} \quad \text{(Equation 1)}$$

The equilibrium constant for this reaction, $K_{eq}$, is described by equation 1, where $[BF_3(\text{gas})]$ is expressed as the pressure of gaseous $BF_3$ in atmospheres. $K_{eq}$ is dependent upon the change in Gibbs free energy for the reaction, $\Delta G_{rxn}$, which is a measure of the binding affinity between $BF_3$ and B. The relationships between ΔG, K, and temperature (in Kelvin) are given in equations 2 and 3.

$$\Delta G = \Delta H - T\Delta S \quad \text{(Equation 2)}$$

$$\Delta G = -RT \ln K \quad \text{(Equation 3)}$$

The value $\Delta E_{rxn}$ can be used as an approximate value for the change in enthalpy (ΔH, see equation 2). Also, if it is assumed that the reaction entropy (ΔS) is about the same for similar reactions, e.g., reversible reactions under the same temperature and pressure conditions, the values calculated for $\Delta E_{rxn}$ can be used to compare against $\Delta G_{rxn}$ for those reactions on a relative basis, i.e., $\Delta G_{rxn}$ is approximately proportional to $\Delta E_{rxn}$. Thus, the values calculated for $\Delta E_{rxn}$ can be used to help predict reactive groups or compounds having the appropriate reactivity for a given gas.

The following examples are intended to illustrate various embodiments of the invention and are not intended to restrict the scope thereof.

EXAMPLES

General Experimental Procedure

The following is a general procedure for establishing the effectiveness of reactive functional groups which can lead to the synthesis of reactive compounds suited for providing liquid mixtures for storing and delivering gases in the examples. $BF_3$ has been used as the descriptive gas for chemical reaction.

In a glove box, a 25 mL stainless steel reactor or 25 mL glass reactor was charged with a known quantity of a liquid mixture. The reactor was sealed, brought out of the glove box, and connected to an apparatus comprising a pressurized cylinder of pure $BF_3$, a stainless steel ballast, and a vacuum pump vented to a vessel containing a $BF_3$ scavenging material. The gas regulator was closed and the experimental apparatus was evacuated up to the regulator. Helium pycnometry was used to measure ballast, piping and reactor headspace volumes for subsequent calculations. The apparatus was again evacuated and closed off to vacuum. The following steps were used to introduce $BF_3$ to the reactor in increments: 1) the reactor was isolated by closing a valve leading to the ballast, 2) $BF_3$ was added to the ballast (ca. 800 Torr) via a mass flow controller, 3) the reactor valve was opened and the gas pressure was allowed to equilibrate while the reactor contents were stirred. These steps were repeated until the desired equilibrium vapor pressure was obtained. The quantity of $BF_3$ added in each increment was measured by pressure and volume difference according to the ideal gas law. The amount of reacted $BF_3$ was determined by subtracting tubing and reactor headspace volumes.

Example 1 (Comparative)

$BMIM^+BF_4^-$ (1), Lewis Basic Ionic Liquid No Reactive Compound

The purpose of this example is to provide a control and to verify the ability to predict the reactivity of the Lewis basic reactive compound with the Lewis acid gas, $BF_3$. No reactive compound was used in combination with the Lewis basic ionic liquid.

Molecular modeling was used to approximate the effectiveness of $BMIM^+BF_4^-$ as a reactive liquid for the chemical complexation of $BF_3$. The ionic liquid was modeled as an ion-pair, using 1,3-dimethylimidazolium as the cation, and it was assumed that one equivalent of $BF_3$ would react with an anion from each equivalent of $BMIM^+BF_4^-$ (concentration of $BF_4^-$ reactive groups=5.4 mol/L). Structures were calculated using Spartan SGI Version 5.1.3 based on Density Functional Theory (DFT) with minimum energy geometry optimization at the BP level with a double numerical (DN**) basis set. This Lewis basic ionic liquid was calculated to have a $\Delta E_{rxn}$ of −5.5 kcal/mol for its reaction with $BF_3$. Since $\Delta G_{rxn}$ is of higher energy than $\Delta E_{rxn}$ and the optimum $\Delta G_{rxn}$ for the pressure range 20 to 760 Torr at room temperature is ca. −1.1 kcal/mol, the result suggests that the binding properties of $BMIM^+BF_4^-$ may be well suited for reversibly reacting with $BF_3$ (i.e., high working capacity and high % reversibility).

In a glove box, a 25 mL stainless steel reactor was charged with 8.82 g of $BMIM^+BF_4^-$ purchased from Fluka (density=1.2 g/mL), and the general procedure for measuring $BF_3$ reaction was followed. The ionic liquid reacted with 38.4 mmol of $BF_3$ at room temperature and 724 Torr, corresponding to 5.2 mol $BF_3$/L of ionic liquid.

The results show % reversibility=70%, working capacity=3.6 mol/L (room temperature, 20-724 Torr). The experimental $\Delta G_{rxn}$ is −1.6 kcal/mol at 22° C. This example represents a pure liquid-based system that is well matched, as calculated by $\Delta E_{rxn}$ and measured by $\Delta G_{rxn}$, for reversibly binding $BF_3$.

Example 2

Molecular Modeling

Molecular modeling was used to help identify potentially useful Lewis basic hat could be incorporated into polymeric compounds for reversibly binding $BF_3$ based on the system of Example 1. The results suggest that reactive functional Lewis basic groups can be incorporated into compounds suited for storing Lewis acidic gases. Functional groups that have a calculated $\Delta E_{rxn}$ of around −5.5 kcal/mol are believed good candidates for reversibly binding $BF_3$. Structures of the compounds are determined using the DFT method described above (Spartan SGI Version 5.1.3, minimum energy geometry optimization, BP level, double numerical (DN**) basis set). The results are Table 1.

TABLE 1

| Results from DFT Molecular Modeling - Reaction of Lewis Base Functional Groups With $BF_3$. | | |
|---|---|---|
| Cmpd | Reactive Group | $\Delta E_{rxn}$ (kcal/mol) |
| | Ionic Liquids | |
| 1 | $MMIM^+BF_4^-$ | −5.5 |
| 2 | $MMIM^+PF_6^-$ | −2.9 |
| | Amines | |
| 3 | $NH_3$ | −21.2 |
| 4 | $N(CH_3)_3$ | −23.3 |
| 5 | $N(CH_3)H_2$ | −25.6 |
| 6 | Imidazole | −22.6 |
| 7 | $C_5F_5N$ | −1.1 |
| | Ethers | |
| 8 | $O(CH_3)_2$ | −9.1 |
| 9 | $O(CH_2CH_3)_2$ | −6.8 |
| 10 | $O(CF_2CF_3)_2$ | 1.1 |
| 11 | $O(CF_2CH_3)_2$ | 0.2 |
| 12 | $O(CH_2CF_3)_2$ | −1.1 |
| 13 | $(CF_3CH_2)O(CH_2CH_3)$ | −2.5 |
| | Phosphines | |
| 14 | $PH_3$ | −1.6 |
| 15 | $P(CH_3)_3$ | −13.3 |
| | Ketones | |
| 16 | $(CH_3)_2C(O)$ | −7.5 |
| | Sulfur Cmpds | |
| 17 | $(CH_3)_2SO_2$ | −3.0 |
| 18 | $S(CH_3)_2$ | −6.4 |
| 19 | $(CH_3)_2S(O)$ | −12.4 |
| | Nitriles | |
| 20 | $p-NO_2$-PhCN | −2.9 |
| 21 | $CH_3CN$ | −5.1 |
| 22 | PhCN | −5.3 |
| 23 | m-Me-PhCN | −5.7 |
| 24 | p-Me-PhCN | −6.0 |

From the above table it can be seen that the hydrocarbon-substituted amine functionality would be too reactive with $BF_3$ to yield a storage system that will allow for reversible reaction under industrially suited conditions. Excessively high temperatures would be required to thermally remove $BF_3$ from the reactive compounds.

Dialkyl ethers would be expected to bind $BF_3$ too strongly at room temperature, but may be suitable at higher temperatures. Fluorinated alkyl ethers are predicted to bind $BF_3$ to weakly to be useful.

Calculated values of $\Delta E_{rxn}$ for alkyl and aryl nitriles suggest that these compounds are well suited for effective storage and delivery systems, and that the binding affinity for $BF_3$ can be readily tuned by choice of alkyl or aryl substituents.

Calculations indicate that $PH_3$ does not strongly interact with $BF_3$ but trialkyl phosphines bind $BF_3$ too strongly. Mono- and dialkyl phosphines, i.e., $RPH_2$ and $R_2PH$, likely have intermediate reactivity and may be suitable for reversibly binding $BF_3$.

The above functional groups can be incorporated into essentially nonvolatile compounds, e.g. polymers, oils, solids, etc., that can then be used to prepare liquid mixtures containing the reactive compound for reversibly binding $BF_3$ and other Lewis acidic gases. Examples of potentially suitable compounds include polyethylene glycol (cmpd 9), polypropylene glycol (cmpd 9), polytetramethylene ether glycol (cmpd 9), polyvinyl amine (cmpd 5), polyaryl sulfone (cmpd 17), polyphenylene sulfide (cmpd 18), polyacrylic acid, polyvinyl alcohol, polymethyl vinyl ether (cmpd 9), polymethyl vinyl ketone (cmpd 16), polyaniline (cmpd 5), polypyrrole, polythiophene, polyacrylonitrile (cmpd 21) and polyvinyl pyridine.

Example 3 (Comparative)

$BMIM^+PF_6^-$ (2), Ionic Liquid Carrier

The purpose of this example was to confirm that the ionic liquid $BMIM^+PF_6$ does not react as strongly with $BF_3$ as does $BMIM^+BF_4^-$.

In a glove box, a 25 mL reactor was charged with 7.76 g of $BMIM^+PF_6^-$ (density=1.37 g/mL) and the general procedure for measuring $BF_3$ reaction was followed. The ionic liquid reacted with only 2.70 mmol of $BF_3$ at 760 Torr, corresponding to a capacity of 0.48 mol $BF_3$/L of ionic liquid.

The concentration of $PF_6^-$ groups is 4.82 mol/L and, assuming reaction of $BF_3$ occurs with the $PF_6^-$ anion, only 10% of these groups reacted. This slight reaction with $BF_3$ is consistent with the low calculated bond energy, ($\Delta E_{rxn}$ −2.9 vs. −5.5 kcal/mol for $BMIM^+BF_4^-$) so the ionic liquid can be used as an essentially nonreactive liquid carrier.

Example 4 (Comparative)

Tetraglyme, Lewis Basic Reactive Liquid No Reactive Compound

The purpose of this example is to confirm that a poly(alkyl ether) would react too strongly with $BF_3$, as predicted by calculation, to be suitable as a reactive compound when mixed with in a neutral liquid medium for storage and delivery of $BF_3$ at room temperature. A Lewis base having a lesser affinity for the Lewis acidic $BF_3$ may be suited for use at room temperature.

In a glove box, a 25 mL stainless steel reactor was charged with 8.42 g of tetraethyleneglycol dimethyl ether (tetraglyme) purchased from Acros (density=1.01 g/mL), and the general procedure for measuring $BF_3$ reaction was followed. The reaction was highly exothermic and reaction was rapid. The liquid reacted with 103.4 mmol of $BF_3$ at room temperature and 765 Torr, corresponding to 12.3 mol $BF_3$/L of liquid.

As predicted by molecular modeling of alkyl ethers (compounds 8 and 9 having a $-E_{rxn}$ of −6.8 to −9.1), tetraglyme reacts too strongly with $BF_3$ at room temperature. Essentially none of the chemically complexed $BF_3$ could be removed under vacuum at room temperature. The reaction with $BF_3$ may be sufficiently reversible at higher temperatures. Tetraglyme may also be suitable at room temperature for a weaker Lewis acidic gas such as $SiF_4$.

Example 5 (Comparative)

Perfluoroalkylpolyether Oil, Nonreactive Liquid

The purpose of this example was to confirm that a poly(perfluoroalkyl ether) will not react with $BF_3$ as predicted by calculation (bond energy predicted from compound 10).

In a glove box, a 25 mL reactor was charged with 9.39 g of a perfluoroalkylpolyether oil (DuPont Krytoxe® brand 1525 pump oil, density=1.9 g/mL), and the general procedure for measuring $BF_3$ reaction was followed. Essentially no reaction occurred. The liquid took up 0.31 mmol of $BF_3$ at room temperature and 400 Torr, corresponding to 0.063 mol $BF_3$/L of liquid. The small amount of $BF_3$ that was taken up was likely dissolved in the oil.

This compound does not react with $BF_3$, which is consistent with the calculated bond energy for a perfluorinated ether (compound 10). This oil possibly could be used as a nonreactive liquid carrier.

Example 6 (Comparative)

Benzonitrile (22), Reactive Liquid No Reactive Compound

The purpose of this example was to confirm that benzonitrile, i.e., a nitrile functionality, has a good capacity for $BF_3$ as predicted by calculation (compound 22, $\Delta E_{rxn}$ −5.3 kcal/mol).

In a glove box, a 25 mL reactor was charged with 5.00 g of benzonitrile from Aldrich (density=1.01 g/mL, vapor pressure=1 mm Hg, 25° C.) and the general procedure for measuring $BF_3$ reaction was followed. The ionic liquid reacted with 49.7 mmol of $BF_3$ at 734 Torr, corresponding to a capacity of 10.0 mol $BF_3$/L of liquid. A white solid formed along the side of the glass flask as the liquid reacted with $BF_3$.

As predicted by molecular modeling, benzonitrile reacts with $BF_3$. Although benzonitrile is too volatile to be used to deliver a pure gas at room temperature, this result suggests that compounds containing nitrile groups would be well suited as reactive compounds for reversibly reacting with $BF_3$.

Example 7

Benzonitrile Dissolved in $BMIM^+PF_6^-$, Lewis Basic Compound in Nonreactive Ionic Liquid Carrier The purpose of this example was to demonstrate that a Lewis basic compound dissolved in an essentially non-reactive liquid, as suggested by Example 6, is useful for storing and delivering $BF_3$.

In a glove box, a 25 mL reactor was charged with 1.27 g of benzonitrile from Aldrich and 2.77 g of $BMIM^+PF_6^-$ from Fluka (31.4 wt % benzonitrile, estimated density=1.26 g/mL), and the general procedure for measuring $BF_3$ reaction was followed. The solution reacted with 12.6 mmol of $BF_3$ at 646 Torr, corresponding to a capacity of 3.93 mol $BF_3$/L of solution. As recognized in Example 6, benzonitrile is too volatile to provide a pure gas without scrubbing the benzonitrile. However, it does show that the nitrile functionality incorporated into a less volatile compound might be well suited.

Example 8

Benzonitrile Dissolved in $BMIM^+BF_4^-$, Lewis Basic Compound in Lewis Basic Ionic Liquid Carrier The purpose of this example is to demonstrate that a Lewis basic compound dissolved in a Lewis basic reactive liquid (Example 1) is useful for storing and delivering $BF_3$.

In a glove box, 2.00 g of benzonitrile from Aldrich was dissolved in 5.00 g of $BMIM^+BF_4^-$ from Chemada Fine Chemicals. 6.76 g of this solution was added to a 25 mL reactor (28.6 wt % benzonitrile, estimated density=1.15 g/mL), and the general procedure for measuring $BF_3$ reaction was followed. The solution reacted with 38.4 mmol of $BF_3$ at 800 Torr, corresponding to a capacity of 6.53 mol $BF_3$/L of solution. The $BF_3$ was removed from the solution and the results show % reversibility=48%, working capacity=3.15 mol/L (room temperature, 30-800 Torr).

Recall the total capacity of $BMIM^+BF_4^-$ in Example 1 was 5.2 mol/L and the working capacity between 20-724 Torr was 3.6 mol/L. Thus, addition of the Lewis basic benzonitrile works to increase the total capacity of the liquid mixture. However, the results also indicate that benzonitrile binds $BF_3$ slightly more strongly than $BMIM^+BF_4^-$ at room temperature and its working capacity is lower over the same pressure range at room temperature.

Example 9

Poly(acrylonitrile) as Lewis Basic Compound Suspended in $BMIM^+PF_6^-$, Nonreactive Ionic Liquid Carrier The purpose of this example is to demonstrate that a nonvolatile Lewis basic compound, poly(acrylonitrile) (similar to compound 21 having an $E_{rxn}$ of −5.1 kcal/mol) suspended in an essentially non-reactive liquid is useful for storing and delivering $BF_3$.

In a glove box, a 25 mL glass reactor was charged with 0.50 g of poly(acrylonitrile) from Aldrich (density=1.18 g/mL) and 3.00 g of $BMIM^+PF_6^-$ from Fluka (mixture contained 14.3 wt % benzonitrile, estimated density=1.30 g/mL). The mixture was stirred to give a suspension, and the general procedure for measuring $BF_3$ reaction was followed. The suspension reacted with 14.8 mmol of $BF_3$ at 674 Torr, corresponding to a capacity of 5.50 mol $BF_3$/L of mixture. The $BF_3$ was removed from the suspension and the results show % reversibility=87%, working capacity=4.78 mol/L (room temperature, 32-674 Torr).

The mixture contained 9.43 mmol of nitrile reactive groups, yet reacted with 14.8 mmol of $BF_3$. This suggests that more than one equivalent of $BF_3$ reacted with the nitrile groups on poly(acrylonitrile). Molecular modeling was carried out using Spartan '04 for Windows (Density Functional Theory, equilibrium geometry at ground state, B3LYP level, 6-31G* basis set). The results indicate that the reaction of a second equivalent of $BF_3$ is favored for acetonitrile, i-butylnitrile, and benzonitrile.

Example 10 (Comparative)

1-(3-Cyanopropyl)-3-Methylimidazolium Tetrafluoroborate (($C_3CN$)$MIM^+BF_4^-$), Containing a Nitrile-Functionalized Cation (Task Specific Ionic Liquid), No Reactive Compound The purpose of this example was to confirm that ($C_3CN$)$MIM^+BF_4^-$, i.e., a task specific ionic liquid containing a nitrile functional group, may be useful for reversibly binding $BF_3$ as predicted by calculation (compound 21, $\Delta E_{rxn}$ −5.1 kcal/mol).

In a glove box, a 25 mL flask was charged with 2.11 g of ($C_3CN$)$MIM^+BF_4^-$ (density=1.87 g/mL), and the general procedure for measuring $BF_3$ reaction was followed. The ionic liquid reacted with 9.00 mmol of $BF_3$ at room temperature and 69 Torr, corresponding to 7.98 mol $BF_3$/L of ionic liquid. This is consistent with more than one equivalent of $BF_3$ reacting with each equivalent of ionic liquid.

It is assumed that $BF_3$ reacts with the $BF_4^-$ anion as well as the nitrile group of the functionalized imidazolium cation. In this case, the full theoretical capacity is 15.8 mol/L (7.89 mol of ionic liquid/L). The mixture became too viscous to stir after adding 8.64 mmol of $BF_3$. The reacted $BF_3$ was removed under vacuum both at room temperature and with external heating, and the viscosity of the liquid decreased as $BF_3$ was removed.

Example 11

1-(3-Cyanopropyl)-3-Methylimidazolium Tetrafluoroborate ($(C_3CN)MIM^+BF_4^-$) Lewis Basic Task Specific Ionic Liquid Dissolved in a Lewis Basic Ionic Liquid Carrier The purpose of this example is to demonstrate that a Lewis basic task specific ionic liquid (Example 10) dissolved in a Lewis basic reactive liquid (Example 1) can act as a reactive compound and is useful for storing and delivering $BF_3$.

In a glove box, a 25 mL Schlenk flask was charged with 1.97 g of $(C_3CN)MIM^+BF_4^-$ (density=1.87 g/mL, volume=1.05 mL) and 1.33 g of $BMIM^+BF_4^-$ (density=1.21 g/mL, volume=1.10 mL). The two liquids were stirred together to make a solution (estimated density=1.53 g/mL) and the general procedure for measuring $BF_3$ reaction was followed. The ionic liquid solution reacted with 19.7 mmol of $BF_3$ at room temperature and 813 Torr, corresponding to 9.12 mol $BF_3$/L of ionic liquid solution.

It is assumed that $BF_3$ reacts with the $BF_4^-$ anions from both ionic liquids as well as the nitrile group of the functionalized imidazolium cation. In this case, the full theoretical capacity is 10.45 mol/L (7.72 mol/L for $(C_3CN)MIM^+BF_4^-$, 2.76 mol/L for $BMIM^+BF_4^-$). The mixture became slightly cloudy, consistent with a high loading of $BF_3$, but retained a low enough viscosity to allow stirring. The $BF_3$ was removed from the mixture and the results show % reversibility=79%, working capacity=7.17 mol/L (room temperature, 20-760 Torr).

In this example, $(C_3CN)MIM^+BF_4^-$ serves as a reactive compound and $BMIM^+BF_4^-$ serves as a Lewis basic ionic liquid carrier. The total and working capacities of the reactive mixture are higher than for $BMIM^+BF_4^-$ alone. Because the viscosity of the reactive mixture is significantly lower than that of $(C_3CN)MIM^+BF_4^-$ alone, the mixture can be loaded with $BF_3$ to a much higher pressure. In practice, this lower viscosity reactive mixture is more effective for storing and delivering $BF_3$ than $(C_3CN)MIM^+BF_4^-$ alone.

The invention claimed is:

1. In a process for storage and delivery of a gas, within a storage and delivery system comprised of a vessel containing a medium capable of storing a gas, and permitting delivery of said gas stored in said medium from said vessel, the improvement which comprises:

storing a gas having Lewis acidity in a reversibly reacted state within a liquid medium incorporating a liquid carrier and a reactive compound having Lewis basicity.

2. The process of claim 1 wherein the liquid carrier has a vapor pressure below about $10^{-2}$ Torr at 25° C.

3. The process of claim 1 wherein at least 50% of the stored gas is removable within a working pressure range of from 20 to 760 Torr at a temperature from 20 to 50° C.

4. The process of claim 1 wherein the liquid carrier is an ionic liquid.

5. The process of claim 1 wherein the Lewis acidic gas is selected from the group consisting of boron trifluoride, diborane, borane, silicon tetrafluoride, germanium tetrafluoride, germane, phosphorous trifluoride, phosphorous pentafluoride, arsenic pentafluoride, sulfur tetrafluoride, tin tetrafluoride, tungsten hexafluoride and molybdenum hexafluoride.

6. The process of claim 1 wherein the reactive compound incorporates Lewis base functionalized monomers selected from the group consisting of polyethylene glycol, polypropylene glycol, polytetramethylene ether glycol, polyvinyl amine, polyaryl sulfone, polyphenylene sulfide, polyacrylic acid, polyvinyl alcohol, polymethyl vinyl ether, polymethyl vinyl ketone, polyaniline, polypyrrole, polythiophene, polyvinyl pyridine, and oligomers and copolymers of ethylene oxide, propylene oxide, acrylic acid, alkyl acrylates, alkyl methacrylates, acrylamide, acrylonitrile, methyl vinyl ketone, methyl vinyl ether, and 4-vinylbenzonitrile.

7. The process of claim 6 wherein the reactive compound has a vapor pressure below about $10^{-2}$ Torr at 25° C.

8. The process of claim 1 wherein the $\Delta G_{rxn}$ for the reactive compound and Lewis acidic gas is from −0.5 to −1.6 kcal/mol at room temperature.

9. The process of claim 1 wherein the Lewis acidic gas is selected from $BF_3$, $SiF_4$, $GeH_4$, and $GeF_4$.

10. The process of claim 9 wherein the reactive compound is polyacrylonitrile.

11. The process of claim 10 wherein the liquid carrier is selected from $BMIM+PF_6^-$ and $BMIM+BF_4^-$.

12. The process of claim 1 wherein the reactive compound is a Lewis basic anionic compound selected from the group consisting of alkoxide, aryloxide, carboxylate, halide, sulfonate, sulfate, borate, phosphate, and arsenate.

13. The process of claim 1 wherein the reactive compound is a salt of an anion selected from the group consisting of $RO^-$, $CH_3CO_2^-$, $HCO_2^-$, $Cl^-$, $Br^-$, $R_2N^-$, $CN^-$, $SCN^-$, $NO_2^-$, $NO_3^-$, $FSO_3^-$, $CF_3SO^{3-}$(OTf), $RSO_3^-$, $ROSO_3^-$, $ClO_4^-$, $BF_4^-$, $BR_4^-$, $PF_6^-$, $PR_3F_3^-$, $AsF_6^-$, and $SO_4^{2-}$, where R is alkyl, cycloalkyl, aryl, alkoxy, aryloxy, haloalkyl, haloalkoxy, or a polymer.

14. The process of claim 13 wherein the counterion of such salt is comprised of an inorganic or organic cation selected from the group consisting of $Na^+$, $K^+$, $Li^+$, $Mg^{2+}$, $Ca^{2+}$, $Ba^{2+}$, $NH_4^+$, $R_3NH^+$, $NR_4^+$, $R_3PH^+$, $PR_4^+$, N-alkylpyridinium, N,N'-dialkylimidazolium, pyridazinium, pyrimidinium, pyrazinium, pyrazolium, pyrrolidinium, triazolium, thiazolium, and oxazolium.

15. The process of claim 14 wherein the reactive compound is selected from the group consisting of $Ca(O_2CH)_2$, $Mg(O_2CCH_3)_2$, $BaSO_4$, $Na_2SO_4$, $KOCH_2CH_3$, $LiN(SO_2CF_3)_2$, $KSO_3CF_3$, $AgSO_3CF_3$, $NaClO_4$, $[(CH_3CH_2CH_2CH_2)_4N][BF_4]$, $[(CH_3CH_2CH_2CH_2)_4N][SO_3CF_3]$, $[(CH_3CH_2CH_2CH_2)_4N][OCH_2CH_3]$, $[(CH_3)_4N][SO_3CH_3]$, $[(CH_3)_4N][CN]$, $[(CH_3)_4N][CH_3SO_3]$, $[(CH_3)_4N][ClO_4]$, $[(CH_3)_4N][SCN]$, $[(CH_3CH_2)_4N][OH]$, $[(CH_3CH_2)_4N][Cl]$, and $[(CH_3CH_2)_4N][Br]$.

16. The porocess of claim 1 wherein the reactive compound is 1-(3-cyanopropyl)-3-methylimidazolium tetrafluoroborate.

17. The process of claim 16 wherein the liquid carrier is selected from $BMIM+PF_6^-$ and $BMIM^+BF_4^-$.

* * * * *

UNITED STATES PATENT AND TRADEMARK OFFICE

CERTIFICATE OF CORRECTION

PATENT NO. : 7,282,084 B2
APPLICATION NO. : 10/966803
DATED : October 16, 2007
INVENTOR(S) : Daniel J. Tempel et al.

It is certified that error appears in the above-identified patent and that said Letters Patent is hereby corrected as shown below:

Column 14, Line 30

In claim 11 delete the word “$BMIM+PF_6$” and insert the word -- $BMIM^+PF_6^-$ --

Column 14, Line 30

In claim 11 delete the word “$BMM+BF_4^-$” and insert the word -- $BMM^+BF_4^-$ --

Column 14, Line 38

In claim 13 delete the word “$CF_3SO^{3-}$(OTf),” and insert the word -- $CF_3SO_3^-$(OTf), --

Column 14, Line 58

In claim 16 delete the word “porocess” and insert the word -- process --

Column 14, Line 62

In Claim 17 delete the word “$BMIM+PF_6$” and insert the word -- $BMIM^+PF_6^-$ --

Signed and Sealed this

Fourth Day of December, 2007

JON W. DUDAS
*Director of the United States Patent and Trademark Office*